Figure 1:
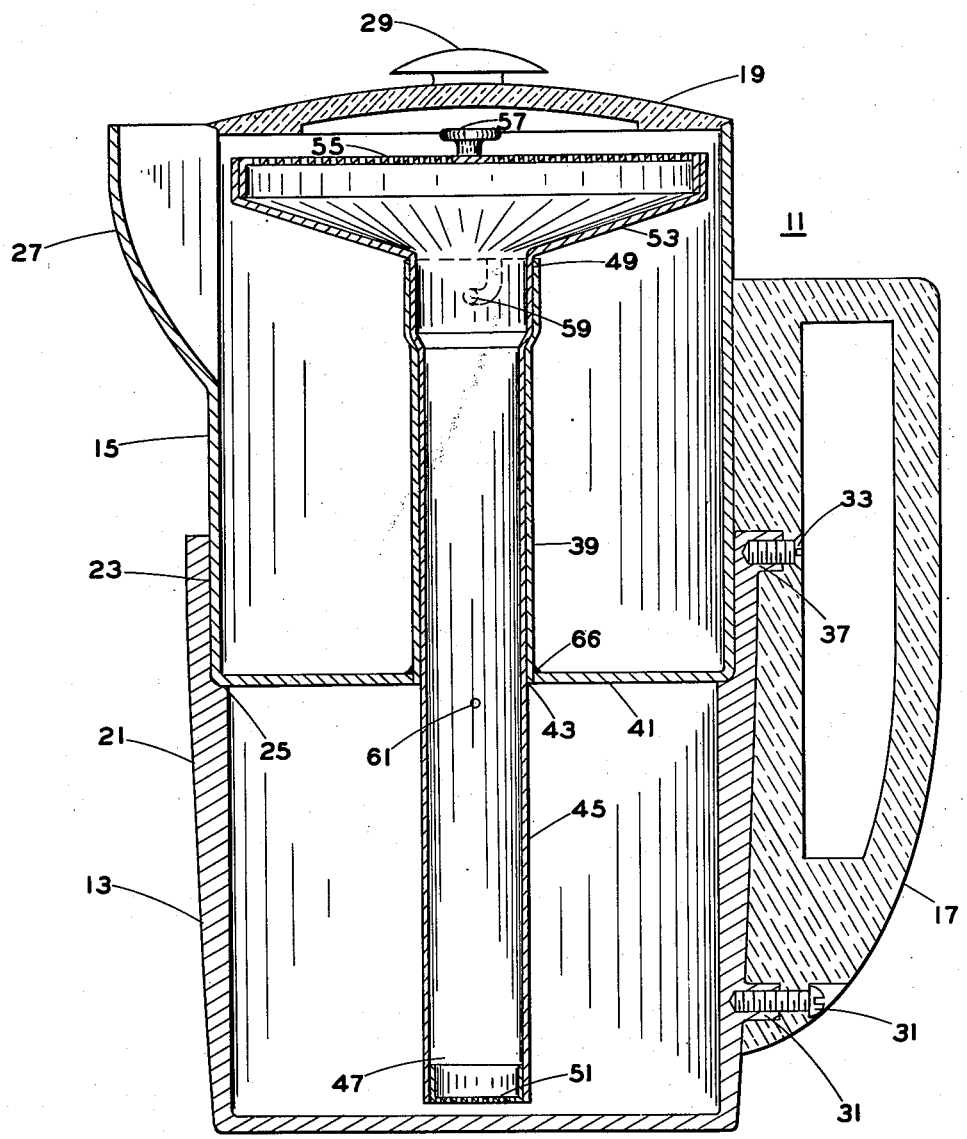

Oct. 9, 1951 P. E. WILLMAN 2,570,997
COFFEE MAKER
Filed Nov. 16, 1946 2 Sheets-Sheet 1

INVENTOR.
PHILIP E. WILLMAN
BY
*H. M. Biebel*
ATTY

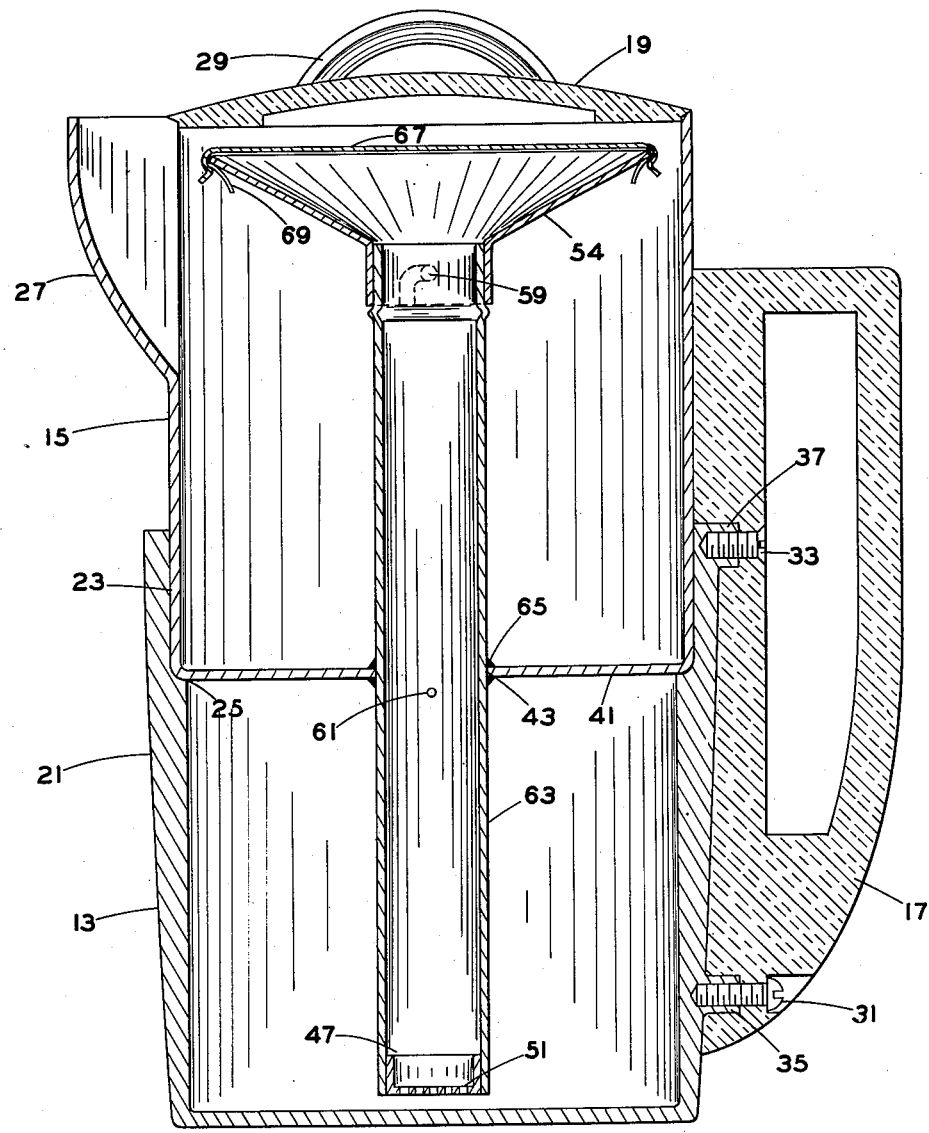

Patented Oct. 9, 1951

2,570,997

UNITED STATES PATENT OFFICE 2,570,997

COFFEE MAKER

Philip E. Willman, Chicago, Ill., assignor to McGraw Electric Company, Elgin, Ill., a corporation of Delaware Application November 16, 1946, Serial No. 710,246

3 Claims. (Cl. 99—317)

My invention relates to coffee makers and particularly to a vacuum-type of coffee maker.

An object of my invention is to provide a novel form of vacuum-type of coffee maker.

Another object of my invention is to provide a novel form of vacuum-type of coffee maker in which the vacuum-type of operation is used but in which the brewed coffee does not return to the water container.

Another object of my invention is to provide a vacuum-type coffee maker in which the tube extending from the water container to the coffee container is utilized to receive and hold the coffee grounds.

Other objects of my invention will either be apparent from a description of several forms of devices embodying my invention or will be pointed out in the course of such description and set forth particularly in the appended claims.

In the drawings:

Figure 1 is a view in longitudinal vertical section through a coffee maker embodying my invention, and, Fig. 2 is a view in longitudinal vertical section through a modified form of coffee maker embodying my invention.

Referring first of all to Fig. 1 of the drawings, I have there illustrated a vacuum-type of coffee maker designated generally by numeral 11, which comprises a lower water heating pot 13 and an upper coffee receiving bowl 15 as well as a handle 17 and a cover member 19.

Since the coffee maker embodying my invention is to operate as a vacuum-type of coffee maker, I provide the water-heating pot 13 preferably of aluminum 21, preferably making the same of cast aluminum, the walls thereof being made as thin as it may be possible to make them. The upper end portion of water-heating pot 13 is provided with a recess 23 therein, this recess being provided with smooth inner surfaces, particularly the vertical surface as well as the horizontal surface 25.

The upper coffee bowl 15 may be made of drawn aluminum and it is to be understood that the fit of upper bowl 15 in the recess 23 at the upper end of the water-heating pot 13 is such that a steam-tight joint will be provided.

The upper bowl 15 is provided with a pouring spout 27 and cover member 19 having a handle 29 secured thereto is also provided. While cover 19 may be of any suitable or desired material, I have shown it to be made of an electric-insulating material which has been molded to the desired shape.

The handle 17 is also preferably made of electric- and heat-insulating material and may be held in proper operative position against the heating pot 13 by a plurality of short-machine screws 31 and 33, these screws extending into lugs 35 and 37 respectively which are cast on the water-heating pot 13. I wish to here point out that the brewed coffee does not flow into the lower heating pot 13 but is adapted to be retained in the upper bowl 15. This will make the weight, to be lifted by an operator, positioned in the upper end portion of the coffee maker so that I prefer to make the handle 17 sufficiently long vertically of the coffee maker so that when it is in use and is handled as for pouring out the coffee to fill one or more cups, it will be well balanced.

I provide an inner centrally-positioned tube 39 which extends through the bottom wall 41 of the upper pot 15 through an opening 43 centrally located in the bottom wall 41. I may braze or weld tube 39 in fluid-type engagement with the bottom wall 41.

I provide further a tube 45 which is provided with an open lower end 47 and with an open upper end 49, the upper end 49 being preferably made somewhat enlarged relatively to the diameter of the rest of tube 45.

I provide a lower perforate member 51 which is preferably adapted to be moved into engagement with the inside surface of tube 45 and to fit tightly therein.

At the upper end of tube 45 I provide an enlarged portion 53 and place in the upper end of said portion 53 a perforated filter 55 having a handle 57 secured thereto.

I desire it to be understood that tube 45 in tube 39 is steam-tight. Since some of the water in heating pot 13 is apt to be vaporized to cause upward flow of the heated water from pot 13 into bowl 15 as through tube 45, the upper filter 55 is adapted to be held by a bayonet joint 59 provided at the upper enlarged end 49 of tube 45. In order to ensure that water shall not flow upwardly prematurely into bowl 15 through the coffee grounds which are adapted to be positioned in tube 45, I provide a small opening 61 in tubes 45 and 39 positioned just above the bottom wall 41 of bowl 15. As is well known, the provision of such a small opening permits the escape of small quantities of steam generated by the water in the heating pot 13 as long as a certain predetermined quantity of steam is not exceeded. But when the temperature of the water in pot 13 rises so that a relatively large amount of steam is generated, this steam will no longer be able to leave through opening 61 and therefore the main body of the hot water in pot 13 will move upwardly through the coffee grounds which have been positioned in tube 45 and from which it will flow into the upper bowl 15.

Referring now to Fig. 2 of the drawings I have there shown a modification of a coffee maker embodying my invention. In this construction I do not use two partially co-extensive tubes but use only a single tube 63 which is adapted to be welded into opening 43 in the lower wall 41 as by welding seams 65. Only such other self-evident modifications as are necessary to provide an operative device have been made in the construction of the modification shown in Fig. 2 as different from that shown in Fig. 1. Substantially the same remarks as made hereinbefore in connection with the operation of the device illustrated in Fig. 1 apply equally well to the device shown in Fig. 2 which has the further advantage that the fit of tube 45 in tube 39 is not necessary since no tube 39 is used in the device shown in Fig. 2 of the drawings.

I may, however, replace the filter 55 of Fig. 1 with a modification comprising an upper or outer metal frame 67 comprising a plurality of radially extending arms and an inner cloth filter 69. The metal frame is adapted to fit on the upper end of the enlarged part 53 with a snap action, the peripheral portion holding the cloth filter 69.

It will be noted that the upper filter is of relatively large diameter and this is found advisable to permit outflow of the coffee essence mixed with hot water from the lower container 13 without causing too much pressure to be generated in container 13 and tube 45 or 63 below the coffee grounds.

Upon tests made upon a sample coffee maker embodying these details it was found that the color of the extract produced at the start of the upward flow of water through the coffee grounds in tube 45 or 63 was quite dark and that the color thereof became lighter the longer the flow of water occurred. It was also found that it was desirable to hold the top filter means in proper operative position at the upper end of either tube 45 or tube 63 and if necessary a light bayonet joint may be provided to hold the upper filter 55 or 67 and 69 in its position in the upper end of either tube 45 or upper tube 53.

Various modifications may be made in the device embodying my invention without departing from the spirit and scope thereof and all such modifications clearly coming within the scope of the appended claims shall be considered as part of my invention.

I claim as my invention:

1. A coffee maker, comprising in combination a lower heating pot, an upper essence-receiving bowl fitted steam-tight to said lower pot, a narrow, coffee-grounds-containing tube connected steam-tight in the bottom of said upper bowl and extending substantially the combined height of said interfitted pot and bowl, whereby said tube constitutes a duct extending from the bottom interior of said pot to the top interior of said bowl, and filter means at the top and bottom of said tube for retaining coffee grounds therein while permitting a flow of liquid therethrough.

2. A coffee maker comprising in combination, a lower heating compartment, an upper essence-receiving compartment thereabove, a narrow coffee-grounds-containing tube extending substantially the combined height of said two compartments whereby said tube constitutes a duct extending from the bottom interior of the lower compartment to the top interior of the upper compartment, said lower compartment being otherwise closed so that pressure therein can force liquid therefrom up through said tube into said upper compartment, and filter means at both the top and bottom of said tube for retaining coffee grounds therein while permitting liquid to flow therethrough and contact coffee grounds substantially throughout the full length of said tube.

3. The coffee maker of claim 1 wherein there is included a handle fastened to said lower pot for supporting said pot and bowl together, and said handle extends up beyond the top of said lower pot, alongside said upper bowl to a position near the top of said upper bowl.

PHILIP E. WILLMAN.

REFERENCES CITED

The following references are of record in the file of this patent:

UNITED STATES PATENTS

| Number | Name | Date |
|---|---|---|
| D. 143,558 | Smith | Jan. 15, 1946 |
| 1,469,139 | Acquaviva | Sept. 25, 1923 |
| 1,582,685 | Pence | Apr. 27, 1926 |
| 1,809,294 | Guerin et al. | June 9, 1931 |
| 2,046,710 | Umstott | July 7, 1936 |

FOREIGN PATENTS

| Number | Country | Date |
|---|---|---|
| 6,362 | Great Britain | A. D. 1883 |
| 465,815 | France | Feb. 14, 1914 |